(12) United States Patent
Yamamoto

(10) Patent No.: US 10,382,635 B2
(45) Date of Patent: Aug. 13, 2019

(54) IMAGE PROCESSING DEVICE AND NON-TRANSITORY RECORDING MEDIUM

(71) Applicant: Konica Minolta, Inc., Tokyo (JP)

(72) Inventor: Kenzo Yamamoto, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/038,258

(22) Filed: Jul. 18, 2018

(65) Prior Publication Data
US 2019/0037088 A1    Jan. 31, 2019

(30) Foreign Application Priority Data

Jul. 27, 2017  (JP) ................................ 2017-145202

(51) Int. Cl.
*H04N 1/00* (2006.01)
*H04N 1/393* (2006.01)
*G06F 3/12* (2006.01)
*H04N 1/40* (2006.01)

(52) U.S. Cl.
CPC ....... *H04N 1/00424* (2013.01); *G06F 3/1206* (2013.01); *G06F 3/1236* (2013.01); *G06F 3/1285* (2013.01); *H04N 1/3935* (2013.01); *H04N 1/40012* (2013.01); *H04N 2201/0094* (2013.01)

(58) Field of Classification Search
CPC .......... H04N 1/00424; H04N 1/40012; H04N 1/3935; H04N 2201/0094; G06F 3/1206; G06F 3/1236; G06F 3/1285
See application file for complete search history.

(56) References Cited

U.S. PATENT DOCUMENTS

| | | | |
|---|---|---|---|
| 2012/0072853 A1* | 3/2012 | Krigstrom | G06F 3/0486 715/748 |
| 2016/0054959 A1* | 2/2016 | Nakamura | G06F 3/1207 358/1.15 |
| 2018/0011724 A1* | 1/2018 | Yoshida | H04N 1/00421 |

FOREIGN PATENT DOCUMENTS

| | | |
|---|---|---|
| JP | 09-190330 | 7/1997 |
| JP | 2006-350634 | 12/2006 |

* cited by examiner

*Primary Examiner* — Neil R McLean
(74) *Attorney, Agent, or Firm* — Baker Hostetler

(57) ABSTRACT

An image processing device capable of communicating with a remote terminal to apply image processing, comprising: a display; and a hardware processor that: communicates with the remote terminal and obtains an icon image of a file stored in the remote terminal; obtains a file subjected to the image processing; applies the image processing specified by a user to the obtained file; enables the display to display the unprocessed file before the image processing is applied or the processed file after the image processing is applied using the icon image; and processes the icon image displayed on the display based on the image processing specified by the user.

15 Claims, 12 Drawing Sheets

IMAGE PROCESSING DEVICE 1

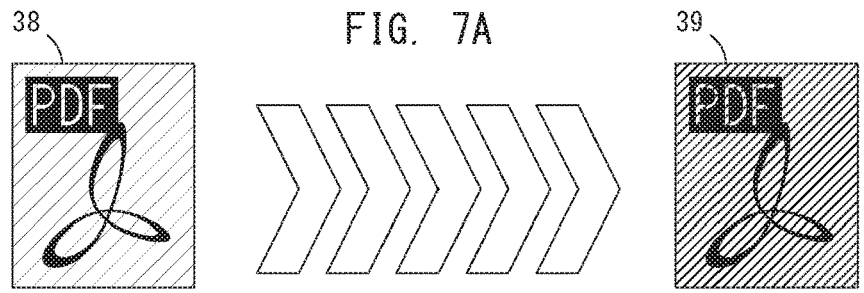
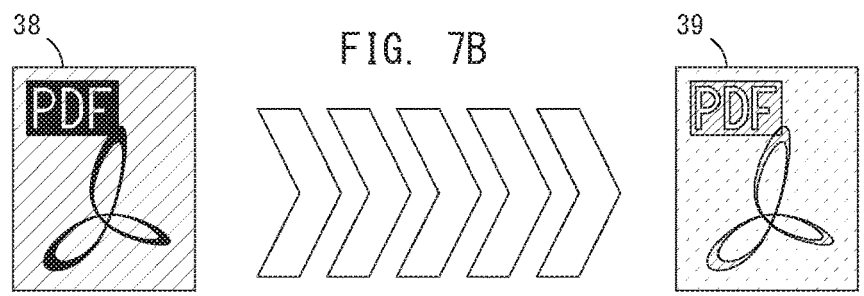
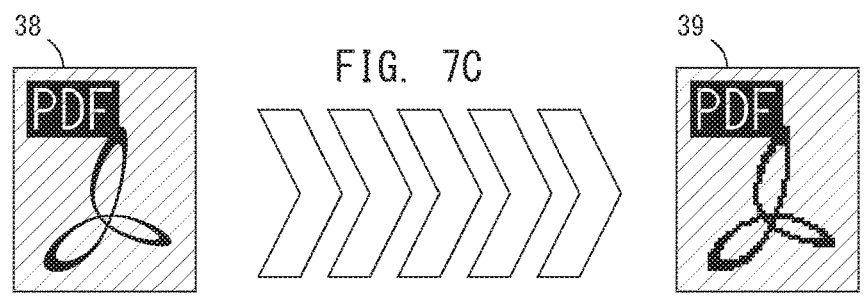
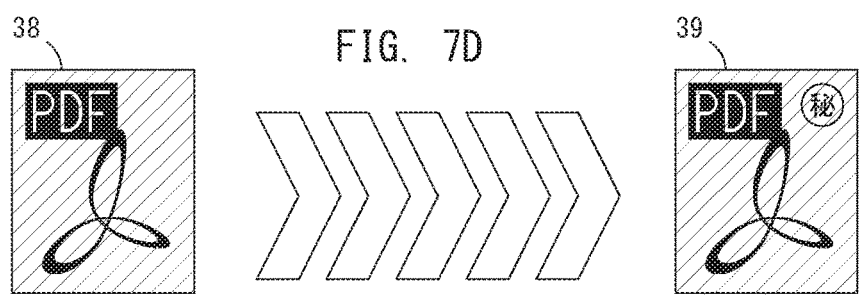
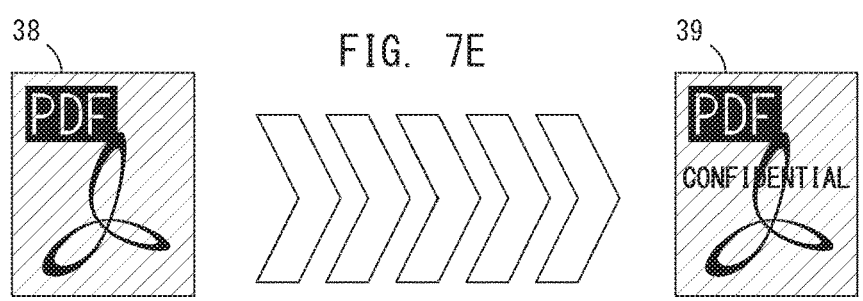

FIG. 8
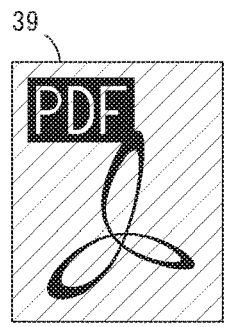
DENSITY CONVERSION
(NORMAL → + 1)
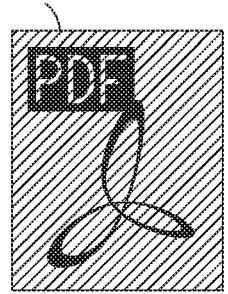
RESOLUTION CONVERSION
(NORMAL → − 1)
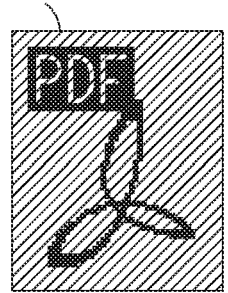
ADDITION OF WATERMARK
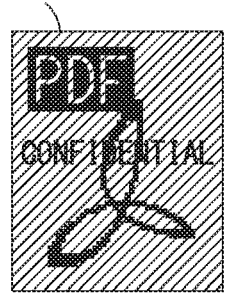

IMAGE PROCESSING DEVICE AND NON-TRANSITORY RECORDING MEDIUM

The entire disclosure of Japanese patent application No. 2017-145202 filed on Jul. 27, 2017, is incorporated herein by reference in its entirety.

BACKGROUND

Technological Field

The present invention relates to an image processing device and a non-transitory recording medium. The present invention more specifically relates to an image processing device capable of working together with a remote terminal.

Description of the Related Art

There are conventional information processing devices that display icons corresponding to respective files. When it is determined a stored file is being converted, the information processing device obtains attribution of the file before conversion, then creates an icon image corresponding to the file attribution before conversion and displays the icon image thereby created. This known technique is introduced for example in Japanese Patent Application Laid-Open No. JP H09-190330 A. According to the known technique, when, for example, the file conversion is carried out such as by zip compression, for instance, a new icon image is created. The new icon image is formed by superimposing an image showing that compression conversion is carried out on the icon image corresponding to a file format of the original file. The icon image may show the original file before conversion is in what file format.

An image processing device such as one of MFPs (Multifunction Peripherals) communicates with a remote terminal such as a portable terminal, thereby obtaining a file from the remote terminal and applying image processing. The image processing applied at the image processing device includes a variety of processings. As a part of examples, the image processing device may apply the image processing including density conversion, resolution conversion, conversion from color image to black and white image and addition of a stamp.

The image processing to be applied to the file as described above may be specified. In such a case, the aforementioned image processing device displays the icon image of the file before processing, which is subjected to the image processing, and the icon image corresponding to the file created after image processing on an operational panel which is being operated by a user. The user may see how the file is converted through the image processing. The image processing device reads and displays the icon image corresponding to the file format of the file before processing and the icon image corresponding to the file format of the file created after the image processing from among the multiple icon images corresponding to the various types of the file formats stored in the image processing device.

The icon images stored in the image processing device generally do not share a common look and feel with the icon images displayed on the remote terminal usually used by the user. If the image processing device uses the icon image stored inside for displaying the icon image corresponding to the file before and after the image processing, the user may feel strange.

In order to avoid the strange, it is better to unify the icon image to be displayed on the operational panel of the image processing device to the icon image to be displayed on the remote terminal. However, even if the image processing device is allowed to obtain the icon image corresponding to the file before image processing from the remote terminal, it cannot find in advance what file is to be created through the image processing. The image processing device is not allowed to obtain the icon image corresponding to the file created after the image processing from the remote terminal and display the obtained icon image. The image processing device cannot show the user how the file is converted through the image processing.

SUMMARY

The present invention is intended to solve the above problems. Thus, the present invention is intended to provide an image processing device and a non-transitory recording medium capable of showing a user how a file is converted through an image processing using an icon image which shares a common look and feel with an icon image displayed on a remote terminal.

First, the present invention is directed to an image processing device capable of communicating with a remote terminal to apply image processing.

To achieve at least one of the abovementioned objects, the image processing device, comprising: a display; and a hardware processor that: communicates with the remote terminal and obtains an icon image of a file stored in the remote terminal; obtains a file subjected to the image processing; applies the image processing specified by a user to the obtained file; enables the display to display the unprocessed file before the image processing is applied or the processed file after the image processing is applied using the icon image; and processes the icon image displayed on the display based on the image processing specified by the user.

Second, the present invention is directed to a non-transitory recording medium storing a computer readable program, execution of the computer readable program is by an image processing device that includes a display capable of displaying an image.

To achieve at least one of the abovementioned objects, according to an aspect of the present invention, the non-transitory recording medium reflecting one aspect of the present invention stores the computer readable program, execution of which by the image processing device causing the image processing device to perform: communicating with a remote terminal and obtaining an icon image of a file stored in the remote terminal; obtaining a file subjected to an image processing; applying the image processing specified by a user to the obtained file; enabling the display to display the unprocessed file before the image processing is applied or the processed file after the image processing is applied using the icon image; and processing the icon image displayed on the display based on the image processing specified by the user.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIGS. 7A to 7E illustrate an exemplary change in an icon image;

FIG. 8 illustrates an example where the icon image successively changes;

DETAILED DESCRIPTION OF EMBODIMENTS

Hereinafter, one or more embodiments of the present invention will be described with reference to the drawings. However, the scope of the invention is not limited to the disclosed embodiments.

(First Preferred Embodiment)

Figure 1:
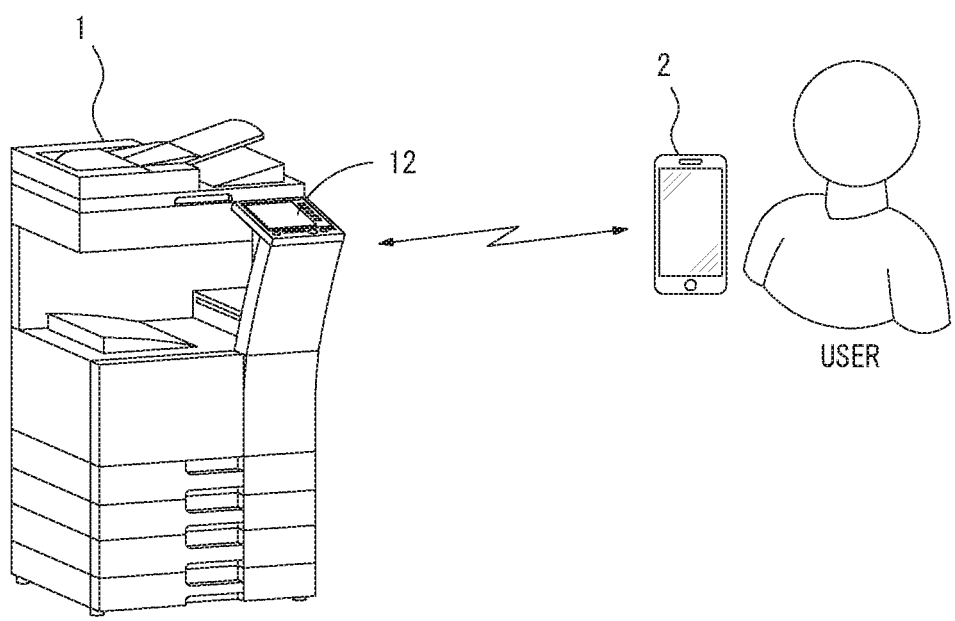
FIG. 1 illustrates an exemplary conceptual configuration of an image processing system.

FIG. 1 illustrates an exemplary configuration of an image processing system in which the first preferred embodiment of the present invention may be practiced. The image processing system includes an image processing device 1 that may be one of MFPs and a remote terminal 2. The image processing device 1 and the remote terminal 2 may communicate with each other. The remote terminal 2 may be a device such as a smartphone, a tablet terminal or a personal computer (PC). The remote terminal 2 may establish wireless communication by such as short distance wireless communication with the image processing device 1. The remote terminal 2 does not always establish wireless communication. The remote terminal 2 communicates with the image processing device 1 over a network 5 such as LAN (Local Area Network).

The image processing device 1 is shared by multiple users. The image processing device 1 has a variety of image processing functions besides copy function, scan function and print function. The image processing functions included in the image processing device 1 enable not only image processing linked with the copy function, scan function and/or print function but also image processing not linked with the copy function, scan function and/or print function. The image processing device 1, for example, applies image processing specified by a user from among multiple image processings to a file designated by the user. The multiple image processings include density conversion, converting density of the image, resolution conversion, converting resolution of the image, black and white conversion, converting color image into black and white, stamp addition, adding a stamp to a predetermined position in the image and addition of a watermark, adding a watermark to a predetermined position in the image.

Besides the aforementioned exemplary the image processings, the image processings that may be applied at the image processing device 1 include file conversion, converting a file format of a file. Once the image processing to convert the file format is specified by the user, the image processing device 1 converts the file format of the file before processing, which is subjected to the image processing, and generates the file in the file format different from that before processing. The file conversion applied at the image processing device, for example, enables creation of a TEXT file or a DOC file from a PDF file.

The image processing device 1 obtains the file to apply the image processing from the remote terminal 2 and applies the image processing. To be more specific, the image processing device 1 communicates with the remote terminal 2, thereby working together with the remote terminal 2. After obtaining the file to apply the image processing from the remote terminal 2, the image processing device 1 may apply the image processing to the obtained file. Moreover, the image processing device 1 may read the file stored therein and apply the image processing.

The image processing device 1 is provided with an operational panel 12, which serves as a user interface. The image processing device 1 displays a screen to receive inputs relating to settings from the user when operating in cooperation with the remote terminal 2. More specifically, the image processing device 1 communicates with the remote terminal 2 and displays a list of the files stored in the remote terminal 2 on the operational panel 12. The image processing device 1 then receives the input relating to selection of the file by the user. Once the file stored in the remote terminal 2 is designated as the one subjected to the image processing by the user, the image processing device 1 obtains the file designated by the user from the remote terminal 2. The image processing device 1 obtains the icon image from the remote terminal 2, and displays the file before or after image processing using the icon image data obtained from the remote terminal 2 on the operational panel 12. The user is allowed to check the file by viewing the icon image the same as that used at the remote terminal 2 which is usually used by him or her.

The image processing 1 then receives the input to specify the image processing from the user. More specifically, the image processing device 1 receives the input to specify at least one of the aforementioned multiple image processings. The user may specify more than two image processings to process the file one after another, that is designated as the file subjected to the image processing. After the image processing is specified by the user, the image processing device 1 applies the same image processing as that specified by the user to the icon image displayed on the operational panel 12, thereby processing the icon image. More specifically, the image processing to be applied to the file is specified, and the icon image of the file displayed on the operational panel 12 is updated to that showing the state after the same image processing as the specified image processing is applied. The user may visually check what image processing is applied when his or her selected image processing is performed. The image processing device 1 is explained more in detail below.

Figure 2:
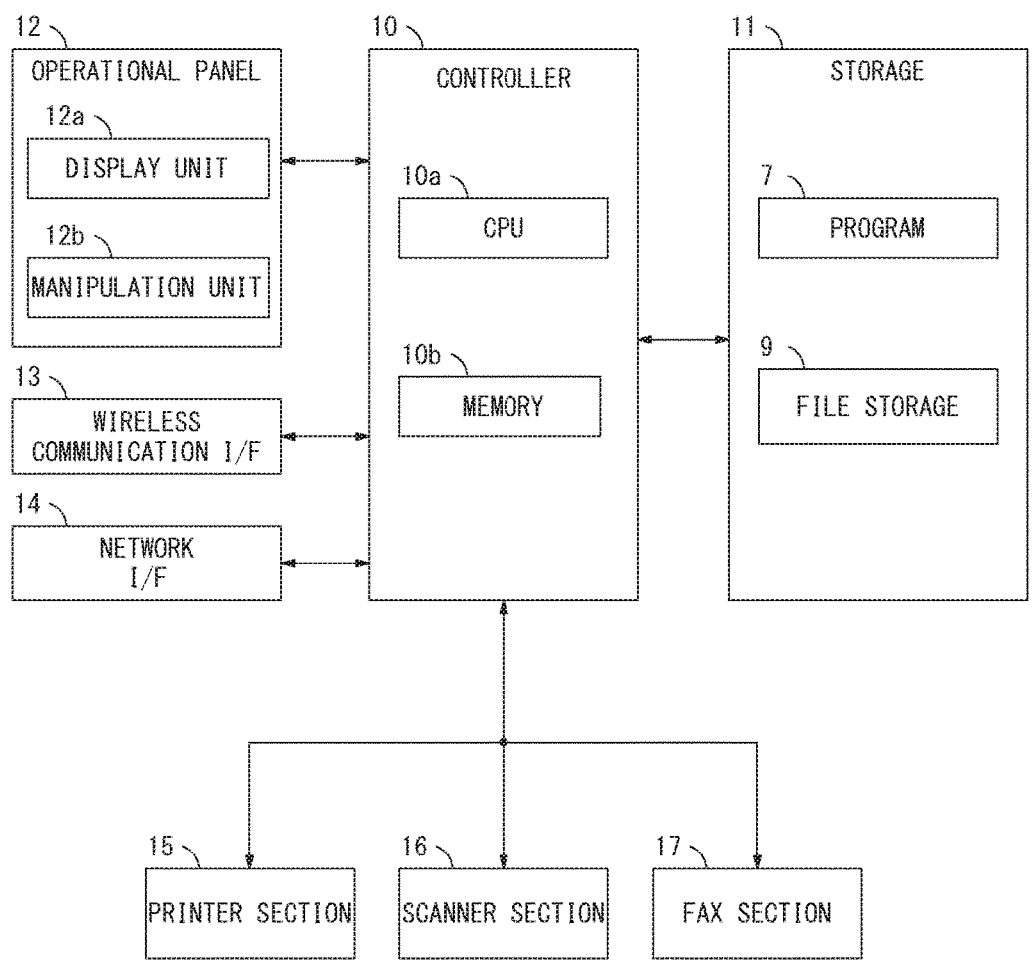
FIG. 2 is a block diagram showing an example of a hardware structure of an image processing device.

FIG. 2 is a block diagram showing an example of a hardware structure of the image processing device 1. As illustrated in FIG. 2, the image processing device 1 includes a controller 10, a storage 11, the operational panel 12, a wireless communication interface 13, a network interface 14, a printer section 15, a scanner section 16 and a fax section 17.

The controller 10 may include a CPU 10a and a memory 10b, for instance. The CPU 10a is a hardware processor that reads and executes a program 7 stored in the storage 11. The memory 10b stores temporary data generated when the CPU 10a processes a process based on the program 7. The memory 10b may be formed from a memory such as a semiconductor memory, for instance. The CPU 10a executes the program 7 so that the controller 10 serves as various types of processing parts which are described later, and controls operations of each part.

The storage 11 is formed from a non-volatility device such as a hard disk drive (HDD), for example. The program 7 executed by the CPU 10a of the controller 10 is stored in advance in the storage 11. The storage 11 includes a file storage 9. The file storage 9 is a storage area to store the file designated by the user. The unprocessed file, which is subjected to the image processing, and/or the processed file created after the image processing, for example, may be stored in the file storage 9.

The operational panel 12 includes a display unit 12a and a manipulation unit 12b. The display unit 12a is constructed by a device such as a color liquid crystal display, for instance. A variety of screens on which the user may operate are displayed on the display unit 12a. The manipulation unit 12b is constructed by parts such as a touch panel sensor arranged on the display area of the display unit 12a. The manipulation unit 12b accepts user inputs.

The wireless communication interface 13 establishes wireless communication with the remote terminal 2 to perform wireless communication with the remote terminal 2. The wireless communication interface 13 may establish communications with the multiple remote terminals 2 at the same time, for example.

The network interface 14 is to connect the image processing device 1 to a network such as LAN. The controller 10, for example, may communicate with the remote terminal 2 via the network interface 14.

The printer section 15 produces a printed output based on input image data. The scanner section 16 optically reads a document placed by the user and constructs image data. The fax section 17 transmits and receives fax data over public phone lines, which are not shown in figures.

Figure 3:
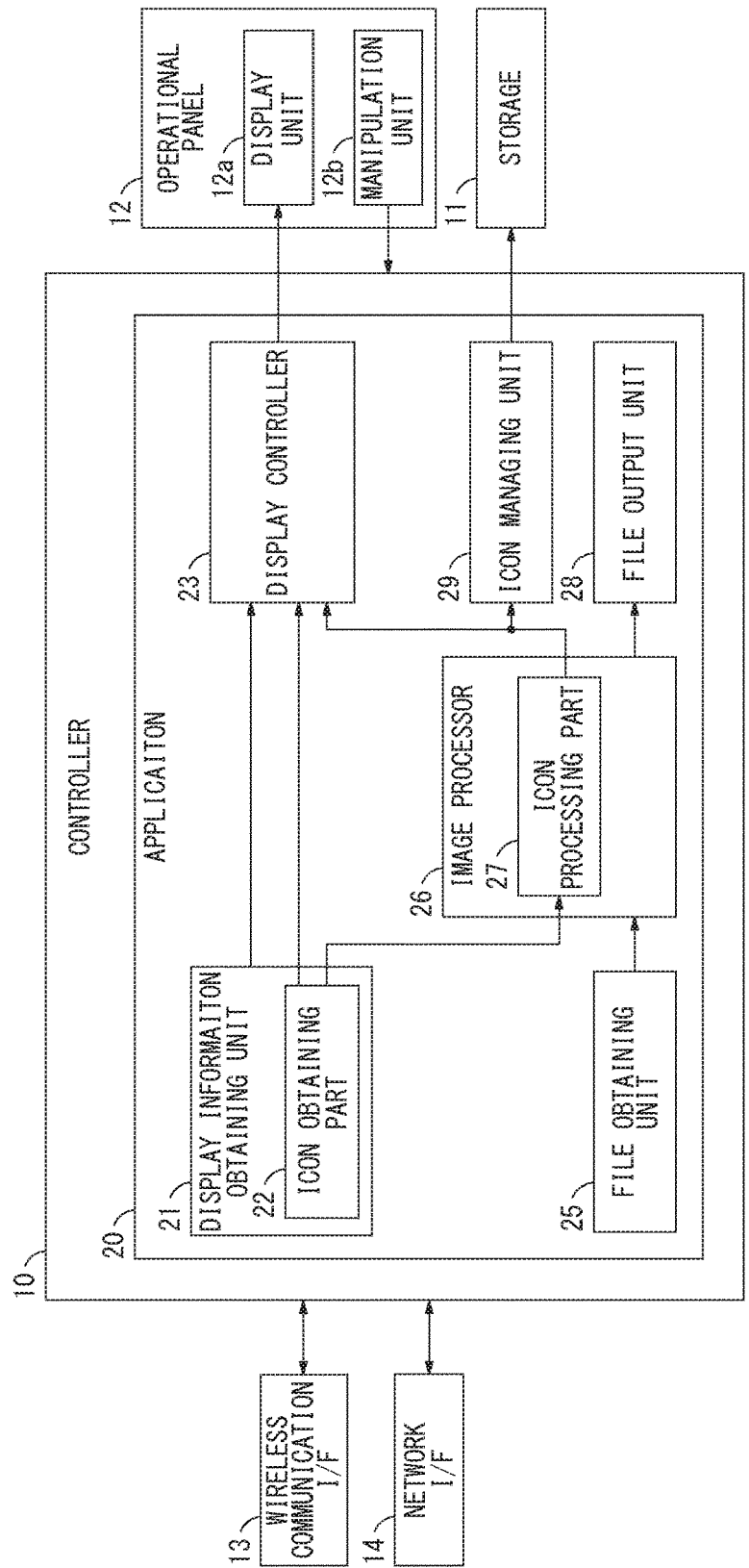
FIG. 3 is a block diagram showing an example of a functional structure of a controller.

A functional structure of the controller 10 is explained next. FIG. 3 is a block diagram showing an example of a functional structure of the controller 10. The CPU 10a executes the program 7 so that the controller 10 brings an application 20 into operation. The application 20 works together with the remote terminal 2 as illustrated in FIG. 3. The application 20 monitors the wireless communication interface 13, for instance. In response to receiving a communication request from the remote terminal 2, the application 20 establishes the communication with the remote terminal 2. When the communication with the remote terminal 2 is established, the controller 10 brings each of a display information obtaining unit 21, a display controller 23, a file obtaining unit 25, an image processor 26, a file output unit 28 and an icon managing unit 29 into operation, and starts working together with the remote terminal 2. The communication with the remote terminal 2 does not have to be wireless communication. It may be over the network such as LAN.

The display information obtaining unit 21 obtains information to display on the display unit 12a of the operational panel 12 from the remote terminal 2, which is an opposite communication party. The display information obtaining unit 21, for example, obtains screen information of a screen displayed on the remote terminal 2. Once obtaining the screen information from the remote terminal 2, the display information obtaining unit 21 outputs the screen information to the display controller 23. The display information obtaining unit 21 includes an icon obtaining part 22.

The icon obtaining part 22 obtains an icon image of the file stored in the remote terminal 2, which is the opposite communication party, from the remote terminal 2. When the file subjected to the image processing is obtained from the remote terminal 2 by the file obtaining unit 25, the icon obtaining part 22 obtains the icon image corresponding to the file from the remote terminal 2. Once obtaining the icon image from the remote terminal 2, the icon obtaining part 22 outputs the icon image to the display controller 23. The icon obtaining part 22 also outputs the icon image obtained from the remote terminal 2 to an icon processing part 27 which is included in the image processor 26.

The icon obtaining part 22 does not always obtain the icon image at the time when obtaining the file from the remote terminal 2. The icon obtaining part 22 may obtain multiple icon images corresponding to all of the file formats stored in the remote terminal 2 when the communication with the remote terminal is established.

The display controller 23 controls the image to display on the display unit 12a of the operational panel 12. Once the image processing device 1 and the remote terminal 2 start working together, for example, the display controller 23 displays a setting screen to receive setting inputs from the user on the display unit 12a. The setting screen is a screen that has 3 divided display areas. The display controller 23 displays a screen of the remote terminal 2 based on the screen information obtained by the display information obtaining unit 21 in one of the areas of the setting screen. The display controller 23 displays an operation screen to specify the intended image processing from among the multiple image processings in another one of the areas of the setting screen. The display controller 23 displays the icon image corresponding to the unprocessed file before to the image processing (hereafter, unprocessed file) and the icon image corresponding to the processed file after the image processing (hereafter, processed file) in the last one of the areas of the setting screen. The display controller 23, for instance, displays the unprocessed file using the icon image directly obtained from the icon obtaining part 22. The display controller 23 displays the processed file using the icon image obtained via the icon processing part 27.

The file obtaining unit 25 identifies the file designated by the user as the one subjected to the image processing based on the user input to the manipulation unit 12b. The file obtaining unit 25 then obtains the identified file. The screen of the remote terminal 2 displayed in one of the areas of the setting screen may be a file list screen, for example. In such a case, the file obtaining unit 25 identifies one of the multiple files displayed on the file list as the one subjected to the image processing based on the user input to the area. The file obtaining unit 25 sends a file request to the remote terminal 2, and obtains the file subjected to the image processing from the remote terminal 2. Once obtaining the file designated by the user, the file obtaining unit 25 outputs the file to the image processor 26. The file obtaining unit 25 not only obtains the file subjected to the image processing from the remote terminal 2 but also obtains from the storage 11.

The image processor 26 applies a variety of image processings to the file obtained by the file obtaining unit 25. The image processor 26 may apply multiple image processings as described above. The image processor 26 receives the input specifying the image processing among from the multiple image processings from the user, for example. The user may press a start key to give an instruction to start the image processing while specifying at least one image processing. The image processor 26 then applies the image processing specified by the user to the file obtained by the file obtaining unit 25. The user may specify more than two image processings as the image processing to be applied to the file. In this case, the image processor 26 applies more than two image processings one after another in the order specified after the start key is pressed by the user.

The image processor 26 includes the icon processing part 27. The icon processing part 27 applies the same image processing as that performed by the image processor 26 to the icon image, thereby processing the icon image. The icon image is a graphical bitmap image for showing what file format the file is in. The icon processing part 17 may apply a variety of image processings such as the aforementioned density conversion, resolution conversion, monochrome conversion, stamp addition and watermark addition to the icon image. Once the image processing to be applied to the file obtained by the file obtaining unit 25 is specified by the user, the icon processing part 17 applies the image processing to the icon image. The icon image is then processed. The icon processing part 17 outputs the processed icon image to the display controller 23. None of the image processings may be specified by the user. The icon processing part 17 then directly outputs the icon image obtained from the icon obtaining part 22 as it is to the display controller 23. The icon image output from the icon processing part 27 to the display controller 23 may be updated when the image processing to be applied to the file is specified by the user.

The display controller 23 uses the icon image received from the icon processing part 27 as described above to display the processed file on the display unit 12a. Once the user specifies the image processing to be applied to the file, the icon image showing the image processed status displayed on the display unit 12a is updated to the icon image to which the specified image processing is applied. This update is carried out before the start key is pressed by the user, which is, more specifically, before the image processing is applied to the file. The user sees the icon image that changes in response to his or her instruction on the image processing, and he or she may understand how the file changes through the specified image processing. Especially, the icon image displayed on the display unit 12a is the one usually familiar for the user, so it is easier for the user to find the change.

The file output unit 28 is brought into operation after the image processing to the file is applied by the image processor 26. The file output unit 28 outputs the processed file to the destination designated by the user. The remote terminal 2 may be designated as the destination to which the processed file is to be output, for example. In this case, the file output unit 28 sends the processed file to the remote terminal 2 via the wireless communication interface 13 or the network interface 14. Another device different from the remote terminal 2 may be designated as the destination of the processed file. The file output unit 28 then sends the processed file to another device via the wireless communication interface 13 or the network interface 14. The file storage 9 of the storage 11 may be designated as the destination of the processed file. The file output unit 28 then outputs the processed file to file storage 9 of the storage 11 and stores it in the file storage 9.

The icon managing unit 29 stores the icon image received from the icon processing part 27 in the storage 11 by associating it with the remote terminal 2 so that manages the icon image. The icon image may be processed by the icon processing part 27. In this case, the icon managing unit 29, for example, stores the processed icon image in the storage 11. The icon managing unit 29 adds identification information, file information and image processing information to the icon image and stores the icon image together with the information in the storage 11. The identification information is to identify the remote terminal 2, the file information is to identify the file format of the file and the image processing information is to identify the image processing applied to the icon image. If the communication with the same remote terminal 2 is established thereafter, the image processing device 1 may use the icon image stored in the storage 11. The icon processing part 27 is not required to apply the same processing as the last time.

Figure 4:
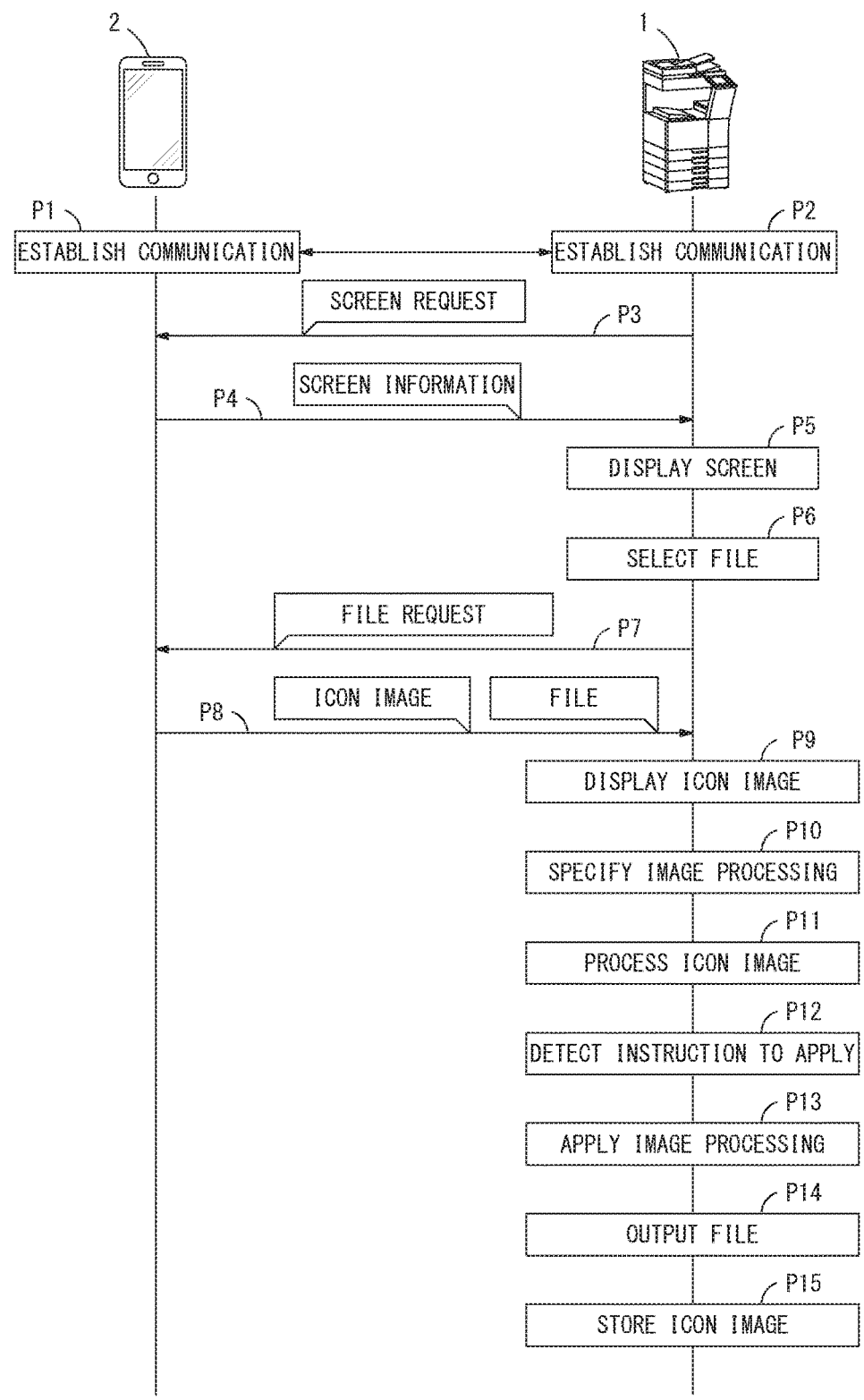
FIG. 4 is a flow diagram showing an exemplary operation performed by the image processing device and a remote terminal in cooperation with each other in which the first preferred embodiment may be practiced.

FIG. 4 is a flow diagram showing an exemplary operation performed by the image processing device 1 and the remote terminal 2 in cooperation with each other. Upon the startup of the application which is operated in cooperation with the image processing device 1 at the remote terminal 2, the remote terminal 2 sends the communication request to the image processing device 1, and establishes the communication with the image processing device 1 (process P1). The image processing device 1 then establishes the communication with the remote terminal 2 (process P2).

After establishing the communication with the remote terminal 2, the image processing device 1 brings the display information obtaining unit 21 into operation to send a screen request to the remote terminal 2 (process P3). The image processing device 1 then obtains the screen information of the screen displayed on the remote terminal 2 (process P4).

The image processing device 1 brings the display controller 23 into operation to display the setting screen to configure the setting of the image processing to be performed in cooperation with the remote terminal 2 on the display unit 12a of the operational panel 12 (process P5).

Figure 5:
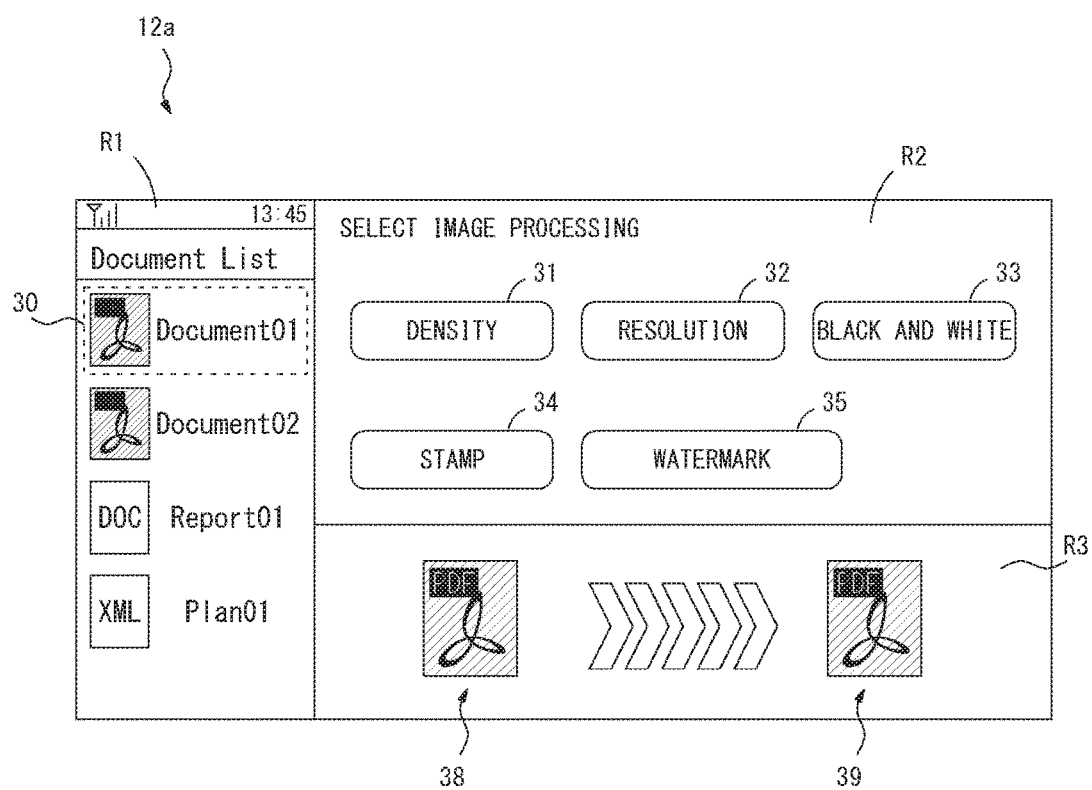
FIG. 5 illustrates an example of a setting screen displayed on the image processing device.

FIG. 5 illustrates an example of the setting screen displayed on the image processing device 1. As illustrated in FIG. 5, the setting screen has 3 areas R1, R2 and R3. The screen based on the screen information obtained from the remote terminal 2 is displayed in the area R1. In the example of FIG. 5, the file list of the file stored in the remote terminal 2 is displayed. The user may designate one of the files displayed on the file list screen as the file subjected to the image processing. The operation screen that allows the user to select the image processing the user wants from among the multiple image processings that may be performed at the image processing device 1 is displayed in the area R2. In the area R2, a density button 31, a resolution button 32, a black and white button 33, a stamp button 34 and a watermark button 35 are displayed, for instance. The user selects and operates one of the multiple buttons 31 to 35 so that he or she may specify the image processing to apply to the file.

The user may drag and drop the icon image of the file displayed in the area R1 on one of the multiple buttons 31 to 35 displayed in the area R2. The drag and drop operation allows the user to select the file and the image processing as a series of actions.

An icon image 38 corresponding to the unprocessed file, which is designated by the user, and an icon image 39 corresponding to the processed file are displayed in the area R3. The area R3 shows the user how the image processing changes the file. When the file subjected to the image processing is not designated by the user, for example, the icon images 38 and 39 are not displayed in the area R3. Once the file subjected to the image processing is designated by the user, the icon image 38 corresponding to the unprocessed file and the icon image 39 corresponding to the processed file are displayed in the area R3. If the user specifies none of the image processings, the same images are shown as two icon images 38 and 39. When the image processing is specified by the user, the icon image 39 is processed based on the specified image processing. The icon image 39 displayed in the area R3 is updated to the image to which the image processing specified by the user is applied.

Referring back to FIG. 4, in process P5, when the setting screen is displayed on the display unit 12a of the operational panel 12, the icon images 38 and 39 are not displayed in the area R3. After displaying the setting screen on the operational panel 12, the image processing device 1 receives the input to select the file from the user (process P6). After the file is selected by the user, the file obtaining unit 25 of the controller 10 is brought into operation. The file obtaining unit 25 sends the file request designating the file to the remote terminal 2 (process P7). The file request includes the icon request requesting the icon image corresponding to the designated file. The image processing device 1 may obtain the file subjected to the image processing and the icon image corresponding to the file from the remote terminal 2 (process P8). After obtaining the icon image together with the file from the remote terminal 2, the file obtaining unit 25 outputs the icon image to the display controller 23. The display controller 23 displays the icon images 38 and 39 in the area R3 using the icon images obtained from the remote terminal 2 (process P9). The icon image 38 showing the unprocessed file and the icon image 39 showing the processed file displayed in the area R3 are the same icon images.

Figure 6:
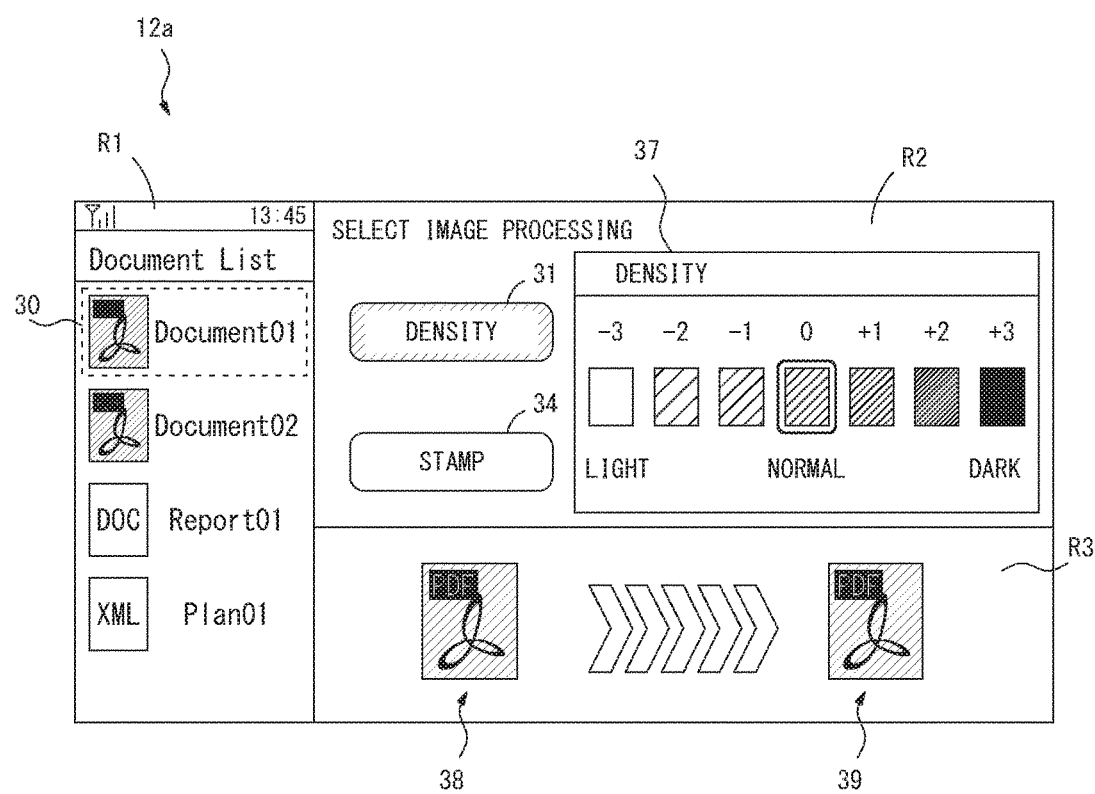
FIG. 6 illustrates a screen example where a density conversion is specified by a user.

The image processing device 1 receives the input to specify the image processing from the user (process P10). FIG. 6 illustrates a screen example where the density conversion is specified by the user. Once the user presses the density conversion button 31, a sub screen 37 to make a detailed setting about the density conversion is displayed on the setting screen as illustrated in FIG. 6. On the sub screen 37, the user may increase in density or make less density in stages. The user may specify another image processing besides the density conversion. In also this case, the sub screen 37 is displayed and the user may configure the detailed setting relating to the image processing specified by the user on the sub screen 37.

After the image processing is specified by the user, the image processing device 1 brings the icon processing part 27 into operation. The icon processing part 27 applies the image processing specified by the user to the icon image obtained by the icon obtaining part 22, and the icon image is processed (process P11). The icon processing part 27 preferably enhances the image processing specified by the user to apply it to the icon image. That is because, the icon image is generally a small rectangular image. It is not always possible for the user to be aware of the change between before and after the image processing if the image processing applied to the icon image is too fine. It is assumed that the user specifies the density conversion enabling the density level of the image to get darker by 1 level. In this case, the icon processing part 27 applies the image processing to enable the density level of the icon image to get darker by 3 levels. It is assumed that the user specifies the density conversion enabling the density level of the image to get lighter by 1 level. In this case, the icon processing part 27 applies the image processing to enable the density level of the icon image to get lighter by 3 levels. This is not only for the density conversion. The image processing is enhanced even when the other image processing besides the density conversion is specified. More specifically, the icon processing part 27 multiplies a setting value of the image processing specified by the user, for instance, by a predetermined number so that the image processing applied to the icon image is enhanced. The user may easily recognize the change in icon images between before and after the image processing. The user may see the change in the icon image how the file changes due to the image processing specified by her or him.

FIGS. 7A to 7E illustrate the change in the icon image 39 displayed in the area R3. FIG. 7A illustrates an example where the density conversion enabling the density of the image to get darker is specified by the user. Once the density conversion enabling the density of the image to get darker is specified, the icon processing part 27 applies the image processing to make the density of the icon image 39 showing the processed file darker. The icon processing part 27 applies the image processing to enable the density level to be darker than the density level actually specified by the user as described above. As a result, as illustrated in FIG. 7A, the icon image 39 showing the processed file is changed to the image with a darker density than the icon image 38 showing the unprocessed file.

FIG. 7B illustrates an example where the density conversion enabling the density of the image to get lighter is specified by the user. Once the density conversion enabling the density of the image to get lighter is specified, the icon processing part 27 applies the image processing to make the density of the icon image 39 showing the processed file lighter. As described above, the icon processing part 27 applies the image processing to enable the density level to be lighter than the density level actually specified by the user as described above. As a result, as illustrated in FIG. 7B, the icon image 39 showing the processed file is changed to the image with a lighter density than the icon image 38 showing the unprocessed file.

FIG. 7C illustrates an example where the resolution conversion enabling the resolution of the image to get lighter is specified by the user. Once the resolution conversion enabling the density of the image to get lighter is specified, the icon processing part 27 applies the image processing to make the density of the icon image 39 showing the processed file lighter. The icon processing part 27 applies the image processing to enable the resolution level to be lighter than the resolution level actually specified by the user as described above. As a result, as illustrated in FIG. 7C, the icon image 39 showing the processed file is changed to the image with a lighter resolution than the icon image 38 showing the unprocessed file.

FIG. 7D illustrates an example where the image processing adding a stamp is specified by the user. Once the image processing to add the stamp is specified, the icon processing part 27 applies the image processing to add the stamp to a predetermined position of the icon image 39 showing the processed file. The icon processing part 27 actually reduces the stamp image to add to the file, and adds the reduced stamp image to the same position as the position of the file where the stamp is added. As a result, as illustrated in FIG. 7D, the icon image 39 showing the processed file is changed to the image with the added stamp image in the same position as the stamp to the file is added.

FIG. 7E illustrates an example where the image processing adding a watermark is specified by the user. Once the image processing to add the watermark is specified, the icon processing part 27 applies the image processing to add the watermark as specified by the user to the icon image 39 showing the processed file. The watermark is an image or a character string added as a watermark to a part or a whole of a document. The watermark is added in a lighter density not to make the document visibility lighter. If the watermark with a light density is added to the icon image 39, the user may not be able to see the watermark added to the icon image 39. The density level of the watermark should be darker so that the user may see when the watermark is added to the icon image 39. The icon processing part 27 also actually reduces the watermark to add to the file, and adds the reduced watermark in the same position as the position where the watermark is added to the file. As a result, as illustrated in FIG. 7D, the icon image 39 showing the processed file is changed to the image with the added watermark visible for the user in the same position where the watermark to file is added.

The user may specify multiple image processings to apply to the single file one after another. Every time the image processing is specified the user, the icon processing part 27 applies the image processing to the icon image 39. FIG. 8 illustrates an example where the image processing to the icon image 39 is repeatedly applied, for instance. At first, the user specifies the density conversion to enable the desity of the image to be darker by one level. The icon processing part 27 then enables the deisity of the icon image 39 showing the processed image to get darker. The user then specifies the resolution conversion to enable the resolution of the image to be lower by one level. The icon processing part 27 applies the image processing to enable the resolution of the icon image 39, which has darker density in response to the last conversion, to get lower resolution. To be more specific, the icon image 39 which has darker density gets the lower resolution. The user then specifies the image processing to add the watermark. The icon processing part 27 adds the watermark as specified by the user to the icon image 39, which has darker density and lower resolution in response to the last conversions. To be more specific, the watermark such as "CONFIDENTIAL" is added to the icon image 39, which has darker density and lower resolution. As described above, the user may specify multiple image processings one after another. The icon processing part 27 then applies the image processing to the icon image 39 one after another every time the image processing is specified by the user. The icon image 39 showing the processed file is displayed in the area R3. The icon image 39 in the area R3 is updated to the image to which the image processing is applied every time the image processing is specified by the user. Hence, the user may figure out how the file changes in response to the image processing, he or she has specified, by viewing the change in the icon image 39.

Referring back to FIG. 4, after the start key is pressed by the user, the image processing device 1 detects the input as the instruction to apply the image processing (process P12). The image processing device 1 brings the image processor 26 of the controller 10 into operation to apply the image processing specified by the user to the file obtained by the file obtaining unit 25 (process P13). Multiple image processings may be specified by the user. In such a case, the multiple image processings are applied to the file one after another. After the image processing by the image processor 26, the file output unit 28 of the controller 10 is brought into operation. The file output unit 28 outputs the file created through the image processing to a destination designated by the user (process P14). The icon managing unit 29 of the controller 10 is brought into operation. The icon managing unit 29 stores the icon image 39 created by the icon processing part 27 in the storage 11 and manages it (process P15).

As described above, the image processing device 1 works with the remote terminal 2. For displaying the icon images 38 and 39 corresponding to the files before and after image processing, the icon image the same as that displayed on the remote terminal 2 may be displayed. The user does not feel strange as the same images are displayed among two devices. Once the image processing should be applied to the file is specified by the user, the icon image 39 showing the processed file is updated to the image showing the file to which the specified image processing is applied. The user may easily figure out what change is made to the file in response to the specified image processing by viewing the change in the icon image 39, which is usually familiar for the user.

Figure 9:
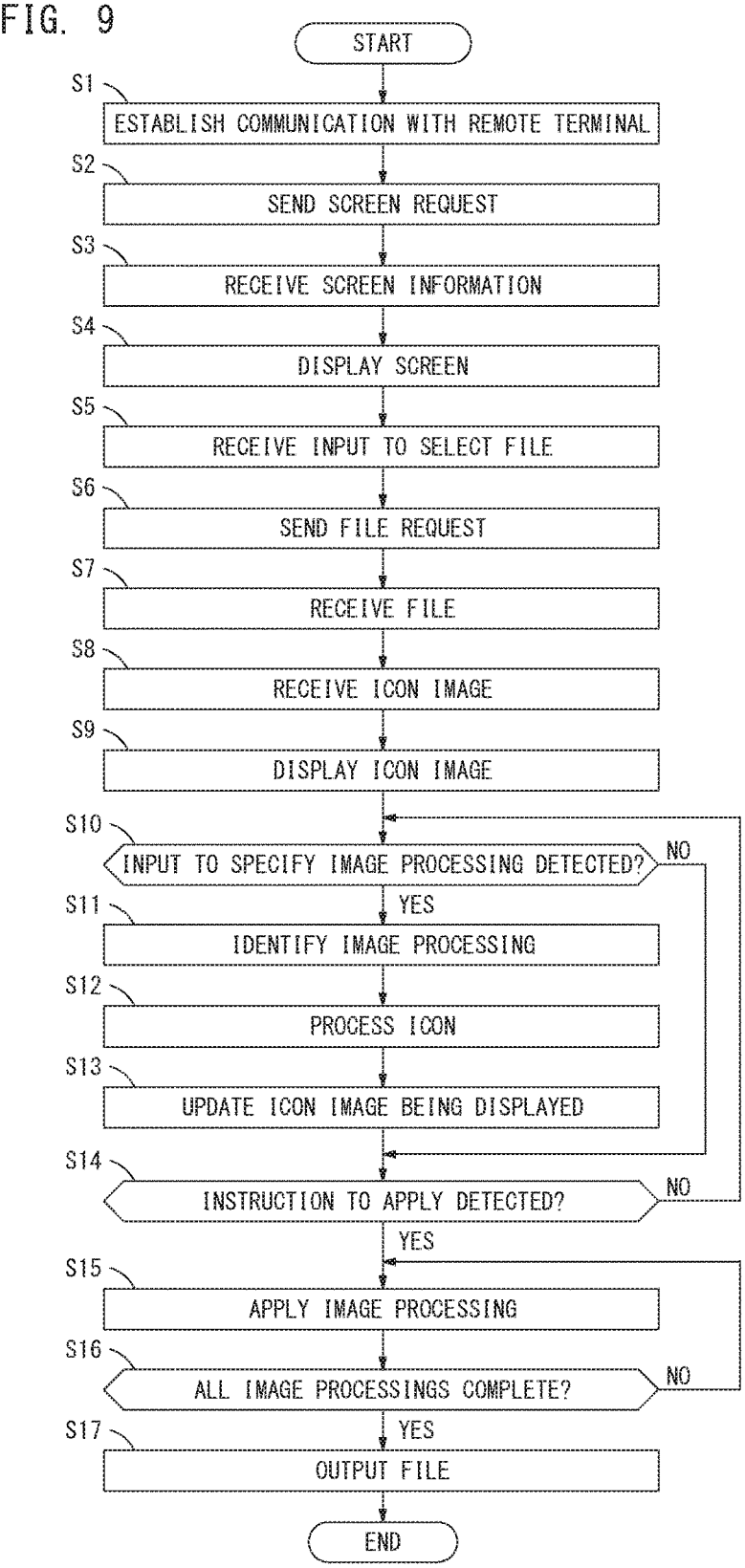
FIG. 9 is a flow diagram showing an exemplary process sequence performed at the image processing device.

In order to perform the cooperation operation as illustrated in FIG. 4, the procedure performed at the image processing device 1 is explained next. FIG. 9 is a flow diagram showing an exemplary process sequence performed at the image processing device 1. The process is performed when the CPU 10a of the controller 10 executes the program 7. Upon the start of the process, the image processing device 1 establishes the communication with the remote terminal 2 (step S1). After establishing the communication with the remote terminal 2, the image processing device 1 sends the screen request to the remote terminal 2 (step S2). The image processing device 1 then receives the screen information from the remote terminal 2 (step S3). The image processing device 1 displays the screen based on the screen information received from the remote terminal 2 in the area R1 of the setting screen of FIG. 5 (step S4).

The image processing device 1 receives the input to select the file from the user (step S5). After the file stored in the remote terminal 2 is selected by the user, the image processing device 1 sends the file request to the remote terminal 2 (step S6). The file request includes the icon request requesting for the icon image corresponding to the designated file. The image processing device 1 receives the file (step S7) and the icon image (step S8) from the remote terminal 2. After receiving the icon image from the remote terminal 2, the image processing device 1 displays the icon images 38 and 39 showing the file before and after the image processing in the area R3 of the setting screen of FIG. 5 (step S9). At this stage, the icon images 38 and 39 displayed in the area R3 are the same images.

The image processing device 1 is then become ready to receive the input from the user. The image processing device 1 determines whether or not the input to specify the image processing from the user is detected (step S10). The input to specify the image processing from the user may be detected (when a result of step S10 is YES). In such a case, the image processing device 1 identifies the image processing specified by the user (step S11). The image processing device 1 applies the specified image processing to the icon image 39 showing the processed file, thereby processing the icon image 39 (step S12). The image processing device 1 updates the icon image 39 showing the processed file displayed on the operational panel 12 to the processed icon image 39 (step S13). The input to specify the image processing from the user may not be detected (when a result of step S10 is NO). In such a case, the image processing device 1 skips the process in steps S11 to S13, and proceeds with the process in step S14.

The image processing device 1 determines whether or not the instruction to perform the image processing from the user is detected (step S14). The instruction to perform the image processing from the user may not be detected (when a result of step S14 is NO). In such a case, the image processing device 1 returns to the process in step S10 to repeatedly perform the above-described process. The user may specify the image processings to be applied to the file one after another from among the multiple image processings.

The instruction to perform the image processing from the user may be detected (when a result of step S14 is YES). The image processing device 1 applies the image processing specified by the user to the file obtained in step S7 (step S15). The multiple image processings may be specified by the user, for example. The image processing device 1 then applies the image processing in the order specified by the user. The image processing device 1 determines if all of the image processings are complete (step S16). If all of the image processings are not complete (when a result of step S16 is NO), the image processing device 1 returns to step S15 to continue with the image processing. If all of the image processings are complete (when a result of step S16 is YES), the image processing device 1 outputs the file created through the image processing to the destination designated by the user (step S17).

As described above, the image processing device 1 of the first preferred embodiment communicates with the remote terminal 2 owned by the user so that the image processing device 1 may obtain and display the icon image of the file stored in the remote terminal 2. The icon image displayed on the image processing device 1 is the icon image usually familiar for the user. The icon image makes easy for the user to figure out whether the file designated as the one subjected to the image processing is correct.

Once the image processing to be applied to the file is specified by the user, the image processing device 1 processes the icon image being displayed based on the specified image processing and displays the processed icon image. The user may check whether the intended image processing is applied by viewing the change in the icon image usually familiar for him or her.

The image processing device 1 displays the icon image 38 corresponding to the file prior to the image processing and the icon image 39 corresponding to the processed file on the display unit 12a. When the image processing is specified by the user, the image processing device 1 processes the icon image 39 corresponding to the processed file. The user may compare the icon image 38 corresponding to the unprocessed file with the icon image 39 corresponding to the processed file so that he or she may easily figure out what change is made to the icon image 39.

The image processing device 1 enhances the image processing specified by the user to process the icon image 39. The remarkable change may be seen in the icon image 39 between before and after the image processing. The user may then be able to figure out easily the change in the icon image 39.

The image processing device 1 is configured to process the icon image 39 prior to the image processing to be applied to the file by the image processor 26. The user may check the change in the icon image 39 after specifying the image processing applied to the file but before pressing the start key. The user then may figure out what change is made by the image processing to the file. If the user determines the image processing is not the one he or she desired, he or she may change the image processing before the image processing to the file is started.

As described above, the icon image sharing the common look and feel with the icon images displayed on the remote terminal may be displayed to the user to indicate how the file changes through the image processing.

(Second Preferred Embodiment)

The second preferred embodiment of the present invention is explained next. In the second preferred embodiment, the operation of the image processing device 1 when the user specifies various types of image processings including the density conversion and/or the resolution conversion after selecting the image processing to convert the file format of the file is explained. The structure of the image processing device 1 of the second preferred embodiment is the same as that of the first preferred embodiment.

Figure 10:
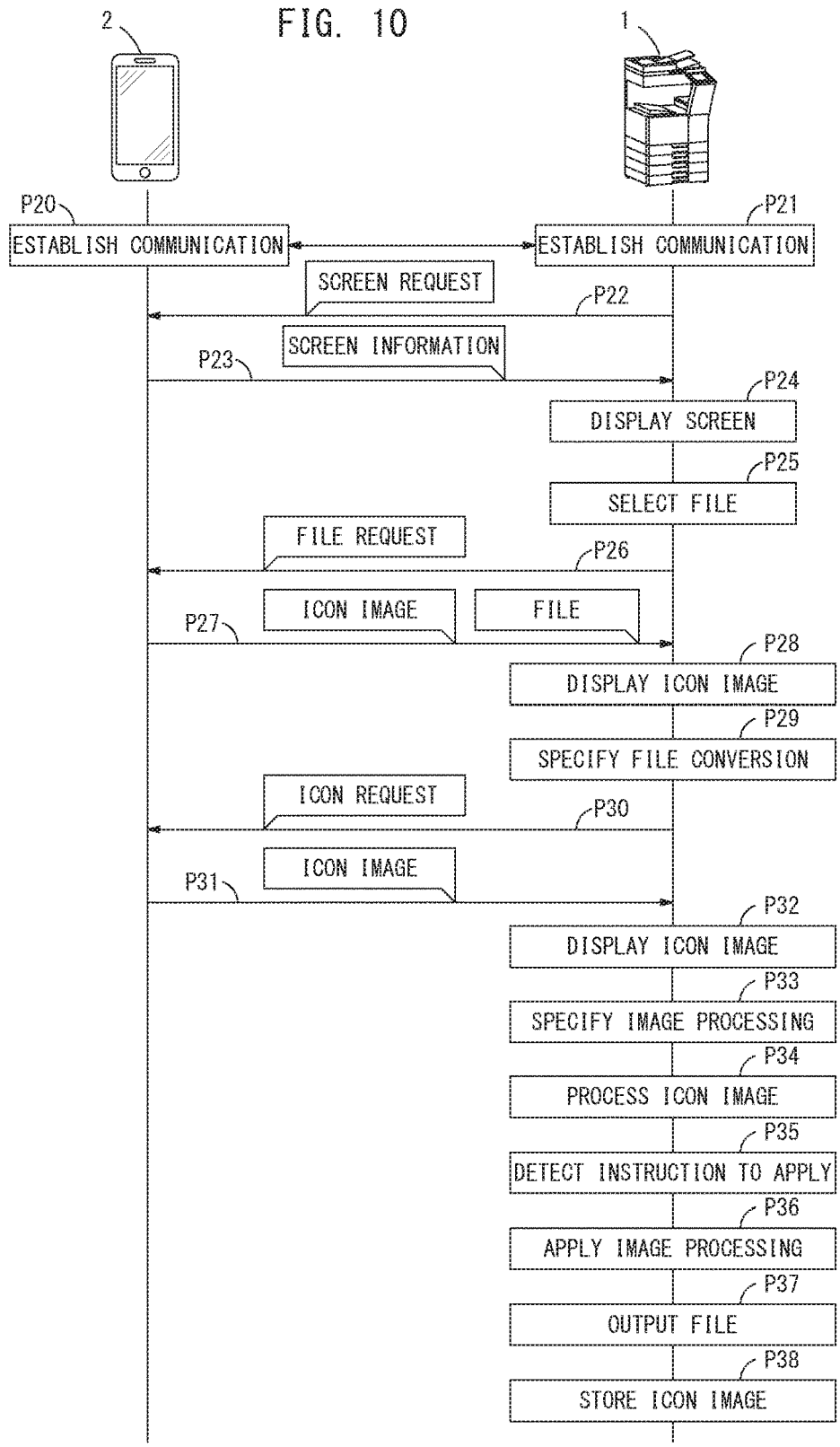
FIG. 10 is a flow diagram showing an exemplary operation performed by the image processing device and the remote terminal in cooperation with each other in which the second preferred embodiment may be practiced.

FIG. 10 is a flow diagram showing an exemplary operation performed by the image processing device 1 and the remote terminal 2 in cooperation with each other. After the communication between the image processing device 1 and the remote terminal 2 is established (processes P20 and P21), the image processing device 1 sends the screen request to the remote terminal 2 (process P22), and obtains the screen information of the screen displayed on the remote terminal 2 (process P23). The image processing device 1 displays the setting screen for configuring the setting of the image processing to be performed in cooperation with the remote terminal 2 on the display unit 12a of the operational panel 12 (process P24).

The image processing device 1 receives the input to select the file from the user (process P25). After the file subjected to the image processing is selected by the user, the image processing device 1 sends the file request to the remote terminal 2 (process P26). The image processing device 1 may obtain the file subjected to the image processing and the icon image corresponding to the file from the remote terminal 2 (process P27). After obtaining the icon image from the remote terminal 2, the image processing device 1 displays the icon images 38 and 39 corresponding to the files before and after the image processing using the icon images (process P28).

Figure 11:
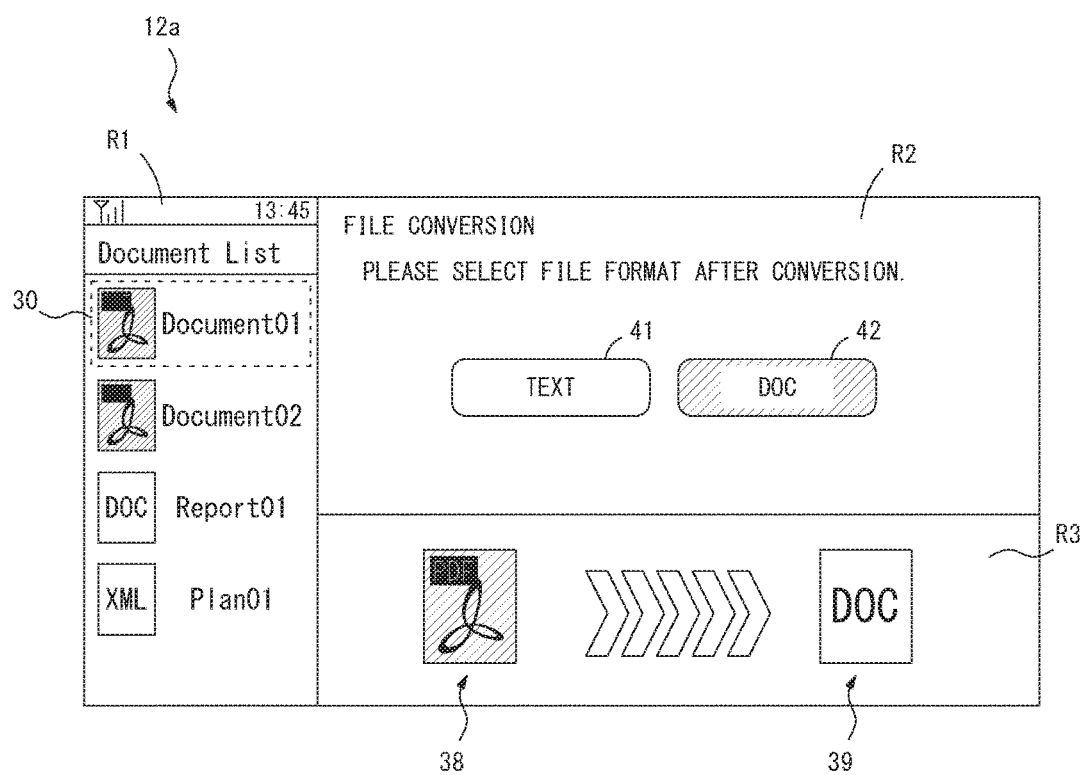
FIG. 11 illustrates a screen example where a file conversion is specified by the user.

In the second preferred embodiment, the file conversion is then specified by the user. FIG. 11 illustrates an example of the screen when the user specifies the file conversion. When converting the file format of the file obtained from the remote terminal 2, the user enables the screen to specify the file conversion to be displayed in the area R2 of the setting screen as illustrated in FIG. 11. In the area R2, for instance, buttons 41 and 42 are displayed. The button 41 is to specify the file format to "TEXT," and the button 42 is to specify the file format to "DOC." The user selects and operates one of the buttons 41 and 42 so that the file format after the file conversion may be specified. In the example of FIG. 11, the user selects the file format, "DOC."

Referring back to FIG. 10, after the file conversion is specified by the user (process P29), the image processing device 1 sends the icon request to request for the icon image corresponding to the file format after file conversion to the remote terminal 2 (process P30). The image processing device 1 may obtain the icon image corresponding to the file format after file conversion from the remote terminal 2 (process P31). After obtaining the icon image corresponding to the file format after the file conversion from the remote terminal 2, the icon obtaining part 22 outputs the icon image to the display controller 23 via the icon processing part 27. The display controller 23 displays the icon image corresponding to the file format after the file conversion as the icon image 39 showing the processed file. As illustrated in FIG. 11, the icon image 39 showing the processed file displayed in the area R3 is changed to the icon image corresponding to the file format after file conversion specified by the user. The user may confirm the file format after the file conversion with the icon image, usually familiar for him or her.

The image processing device 1 receives the input to specify the image processing from the user (process P33). After the image processing is specified by the user, the image processing device 1 brings the icon processing part 27 into operation. The icon processing part 27 processes the icon image 39 showing the processed file (process P34). The icon image 39 showing the processed file displayed in the area R3 may be updated to the image to which the image processing specified by the user is applied.

After the start key is pressed by the user, the image processing device 1 detects the input as the instruction to apply the image processing (process P35). The image processing device 1 applies the image processing specified by the user to the file obtained by the file obtaining unit 25 (process P36). As the image processing to the file is complete, the image processing device 1 outputs the file created through the image processing to the destination designated by the user (process P37). The image processing device 1 stores the icon image created by the icon processing part 27 in the storage 11 and manages it (process P38).

Once the file conversion to convert the file format of the file is specified by the user, the image processing device 1 of the second preferred embodiment obtains the icon image corresponding to the file format after the file conversion from the remote terminal 2. Even when the file conversion is carried out at the image processing device 1, the icon image corresponding to the file format after the file conversion may be displayed by using the icon image displayed on the remote terminal 2. The image processing to be applied to the file having the converted format may be specified by the user. The image processing device 1 then updates the icon image 39 corresponding to the file format after the file conversion to that to which the specified image processing is applied. The user may easily figure out what the image processing is like by viewing the change in the icon image 39.

The operations in the second preferred embodiment besides the above-described operations are the same as those explained in the first preferred embodiment.

(Third Preferred Embodiment)

The third preferred embodiment of the present invention is explained next. In the third preferred embodiment, the operation of the image processing device 1 when the image processing device 1 applies the image processing to the file stored in the storage 11 and outputs the processed file to the remote terminal 2 is explained. The structure of the image processing device 1 of the third preferred embodiment is the same as that of the first preferred embodiment.

Figure 12:
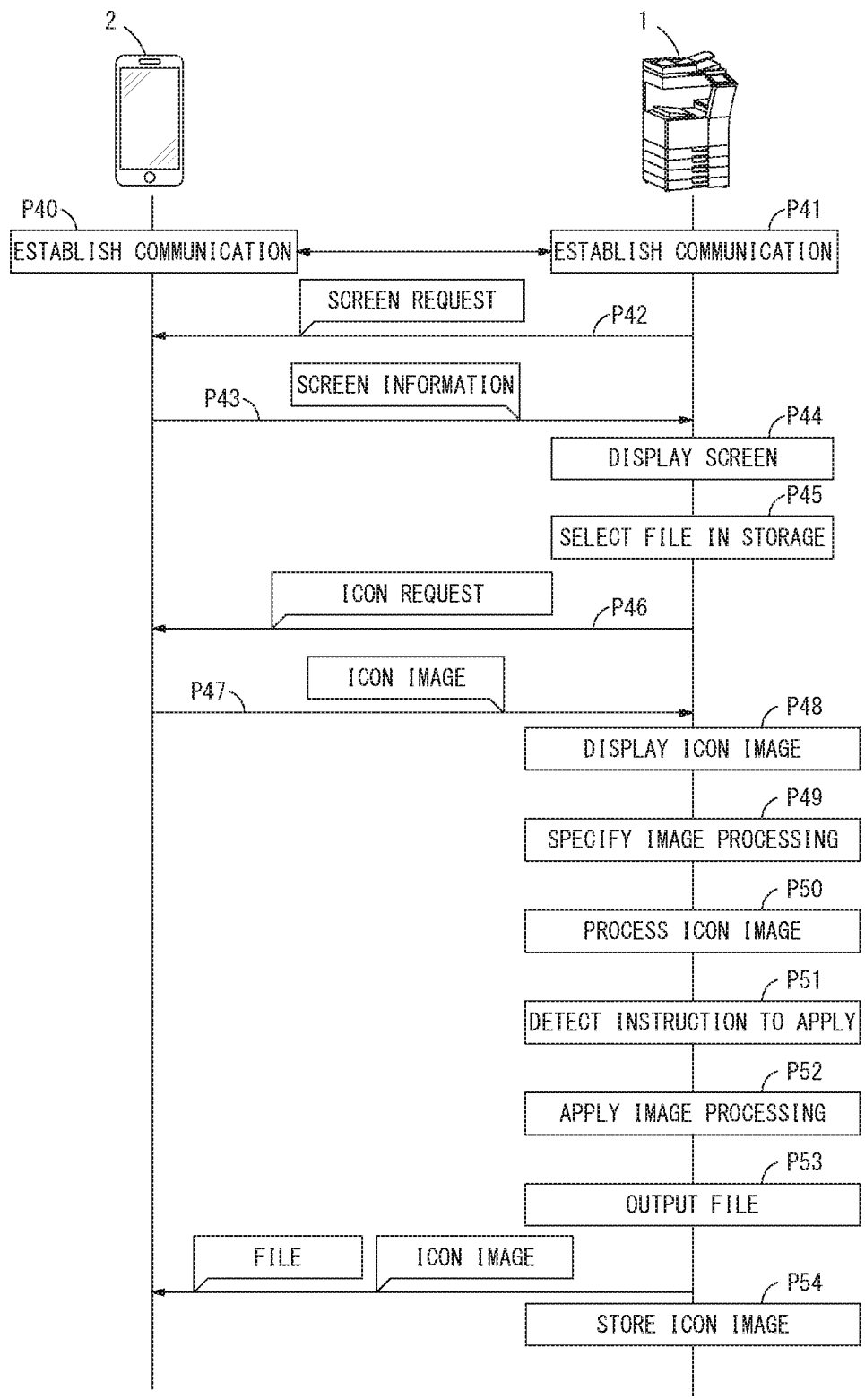
FIG. 12 is a flow diagram showing an exemplary operation performed by the image processing device and the remote terminal in cooperation with each other in which the third preferred embodiment may be practiced.

FIG. 12 is a flow diagram showing an exemplary operation performed by the image processing device 1 and the remote terminal 2 in cooperation with each other in the third preferred embodiment. After the communication between the image processing device 1 and the remote terminal 2 is established (processes P40 and P41), the image processing device 1 sends the screen request to the remote terminal 2 (process P42), and obtains the screen information of the screen displayed on the remote terminal 2 (process P43). The image processing device 1 displays the setting screen for configuring the setting of the image processing to be performed in cooperation with the remote terminal 2 on the display unit 12a of the operational panel 12 (process P44).

The image processing device 1 receives the input to select the file from the user (process P45). The user may designate the file stored in the file storage 9 of the storage 11 as the file subjected to the image processing. After the file stored in the storage 11 is selected by the user, the image processing device 1 brings the icon obtaining part 22 into operation. The icon obtaining part 22 determines the file format of the file designated by the user, and sends the icon request indicating the file format to the remote terminal 2 (process P46). The icon obtaining part 22 may obtain the icon image corresponding to the file format of the file designated by the user from the remote terminal 2 (process P47).

After obtaining the icon image corresponding to the file format of the file designated by the user from the remote terminal 2, the image processing device 1 displays the icon images 38 and 39 corresponding to the files before and after the image processing using the icon images (process P48). The user may confirm the files before and after the image processing with the icon image, usually familiar for him or her, even when he or she designates the file stored in the storage 11 of the image processing device 1.

The image processing device 1 receives the input to specify the image processing from the user (process P49). After the image processing is specified by the user, the image processing device 1 brings the icon processing part 27 into operation to process the icon image 39 showing the processed file (process P50). The icon image 39 showing the processed file displayed in the area R3 may be updated to the image to which the image processing specified by the user is applied.

After the image processing device 1 detects the input as the instruction to apply the image processing from the user (process P51), the image processing device 1 applies the image processing to the file read from the storage 11 (process P52). As the image processing to the file is complete, the image processing device 1 sends the file created through the image processing to the remote terminal 2 which is designated as the destination by the user (process P53). The image processing device 1 sends the icon image processed by the icon processing part 27 together with the file created through the image processing. For displaying the icon image showing the file received from the image processing device 1, the remote terminal 2 may use the icon image 39 processed at the image processing device 1 to display. The image processing device 1 stores the icon image created by the icon processing part 27 in the storage 11 and manages it (process P54).

As described above, in the third preferred embodiment, the icon image may be displayed on the remote terminal 2 even when the file stored in the image processing device 1 is designated as the file subjected to the image processing. The remote terminal 2 may be designated as the destination of the processed file by the user. Even in such a case, according to the third preferred embodiment, the icon image is obtained from the remote terminal, which is the destination, and may be displayed. The user may confirm files before and after the image processing with the icon image, usually familiar for him or her.

When sending the processed file to the remote terminal 2, the image processing device 1 of the third preferred embodiment sends the icon image processed by the icon processing part 27 to the remote terminal 2 together with the file. For displaying the icon image showing the file received from the image processing device 1, the remote terminal 2 may display using the icon image received with the file. By viewing the icon image displayed on the remote terminal 2, the user may easily figure out what image processing is applied to the file.

The operations in the third preferred embodiment besides the above-described operations are the same as those explained in the first preferred embodiment.

(Modifications)

While the preferred embodiments of the present invention have been described above, the present invention is not limited to the preferred embodiments. Various modifications may be applied to the present invention.

In the above-described preferred embodiments discussed earlier, for example, the image processing device 1 is formed from a device such as one of MFPs including multiple functions such as copy function, scan function and/or print function. However, this is given not for limitation. The image processing device 1 does not have to be a device with the functions such as copy function, scan function and/or print function like MFP. More specifically, the image processing device 1 may be any device that is capable of applying the multiple image processings including density conversion and/or resolution conversion as described above, and that is also capable of applying the image processing specified by the user from among the multiple image processings.

In the above-described preferred embodiments discussed earlier, the icon image may be obtained from the remote terminal 2 and displayed in whichever case where the image processing device 1 obtains the file from the remote terminal 2 or outputs the processed file to the remote terminal 2. The image processing device 1, for example, may obtain the unprocessed file from the first remote terminal and output the processed file to the second remote terminal 2. In such a case, the image processing device 1 obtains the icon image corresponding to the unprocessed file from the first remote terminal and obtains the icon image corresponding to the processed file from the second remote terminal.

In the above-described preferred embodiments discussed earlier, the image processing device 1 displays the two icon images, the icon image 38 corresponding to the unprocessed file and the icon image 39 corresponding to the processed file, in the area R3 of the setting screen. However, this is given not for limitation. The number of the icon image displayed in the area R3 of the setting screen may be just one. In this case, when the user specifies the image processing, the image processing device 1 may process the single icon image displayed in the area R3 and display.

Although the embodiment of the present invention has been described and illustrated in detail, the disclosed embodiments are made for purposes of illustration and example only and not limitation. The scope of the present invention should be interpreted by terms of the appended claims.

What is claimed is:

1. An image processing device capable of communicating with a remote terminal to apply image processing, comprising:
    a display; and
    a hardware processor that:
    communicates with said remote terminal and obtains an icon image of a file stored in said remote terminal;
    obtains a file subjected to the image processing;
    applies the image processing specified by a user to the obtained file;
    enables said display to display the unprocessed file before the image processing is applied or the processed file after the image processing is applied using said icon image; and
    processes said icon image displayed on said display based on the image processing specified by the user,
    wherein said hardware processor enhances the image processing specified by the user to process said icon image.

2. The image processing device according to claim 1, wherein
    said hardware processor obtains the file subjected to the image processing from said remote terminal.

3. The image processing device according to claim 1, wherein
    said hardware processor enables said display to display said icon image corresponding to the unprocessed file before the image processing is applied and said icon image corresponding to the processed file to which the image processing is applied, and
    processes said icon image corresponding to the processed file to which the image processing is applied.

4. The image processing device according to claim 1, wherein
    said icon image is a bitmap image corresponding to a file format of the file subjected to the image processing.

5. The image processing device according to claim 1, wherein
    said hardware processor further outputs the file created through the image processing to said remote terminal, and
    outputs said processed icon image to said remote terminal when outputting the processed file to said remote terminal.

6. The image processing device according to claim 1, wherein
    said hardware processor processes said icon image at the time when the image processing is specified by the user.

7. The image processing device according to claim 1, wherein
    said hardware processor processes said icon image before the image processing is applied to the file subjected to the image processing.

8. The image processing device according to claim 1, wherein
    said hardware processor further manages said processed icon image stored in a predetermined storage in association with said remote terminal.

9. A non-transitory recording medium storing a computer readable program, execution of the computer readable program by an image processing device that includes a display capable of displaying an image, the program causing said image processing device to perform:
    communicating with a remote terminal and obtaining an icon image of a file stored in said remote terminal;
    obtaining a file subjected to an image processing;
    applying the image processing specified by a user to the obtained file;
    enabling said display to display the unprocessed file before the image processing is applied or the processed file after the image processing is applied using said icon image; and
    processing said icon image displayed on said display based on the image processing specified by the user,
    wherein the image processing specified by the user is enhanced, and said icon image is processed based on the enhanced image processing.

10. The non-transitory recording medium according to claim 9, wherein
    said display is enabled to display said icon image corresponding to the unprocessed file before the image processing is applied and said icon image corresponding to the processed file to which the image processing is applied, and
    said icon image corresponding to the file to which the image processing is applied is processed.

11. The non-transitory recording medium according to claim 9, wherein
said icon image is a bitmap image corresponding to a file format of the file subjected to the image processing.

12. The non-transitory recording medium according to claim 9, the program causing said image processing device to further perform:
outputting the file created through the image processing to said remote terminal, wherein
said processed icon image is output to said remote terminal when the processed file is output to said remote terminal.

13. The non-transitory recording medium according to claim 9, wherein
said icon image is processed at the time when the image processing is specified by the user.

14. The non-transitory recording medium according to claim 9, wherein
said icon image is processed before the image processing is applied to the file subjected to the image processing.

15. The non-transitory recording medium according to claim 9, the program causing said image processing device to further perform:
managing said processed icon image stored in a predetermined storage in association with said remote terminal.

* * * * *